United States Patent
Reddy

(10) Patent No.: US 8,682,075 B2
(45) Date of Patent: Mar. 25, 2014

(54) REMOVING CHARACTER FROM TEXT IN NON-IMAGE FORM WHERE LOCATION OF CHARACTER IN IMAGE OF TEXT FALLS OUTSIDE OF VALID CONTENT BOUNDARY

(75) Inventor: Prakash Reddy, Fremont, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 330 days.

(21) Appl. No.: 12/980,036

(22) Filed: Dec. 28, 2010

(65) Prior Publication Data

US 2012/0163718 A1    Jun. 28, 2012

(51) Int. Cl.
*G06K 9/34* (2006.01)

(52) U.S. Cl.
USPC .......................................... 382/176; 382/310

(58) Field of Classification Search
None
See application file for complete search history.

(56) References Cited

U.S. PATENT DOCUMENTS

| | | | |
|---|---|---|---|
| 5,201,011 A * | 4/1993 | Bloomberg et al. | 382/175 |
| 5,371,673 A * | 12/1994 | Fan | 704/1 |
| 5,465,307 A | 11/1995 | Azumaya et al. | |
| 5,664,210 A * | 9/1997 | Fleming et al. | 715/246 |
| 5,666,552 A * | 9/1997 | Greyson et al. | 715/210 |
| 5,781,198 A | 7/1998 | Korn | |
| 5,883,986 A * | 3/1999 | Kopec et al. | 382/310 |
| 5,974,199 A | 10/1999 | Lee et al. | |
| 6,430,320 B1 | 8/2002 | Jia et al. | |
| 6,560,376 B2 | 5/2003 | Kimbell et al. | |
| 6,640,010 B2 * | 10/2003 | Seeger et al. | 382/229 |
| 6,757,081 B1 | 6/2004 | Fan et al. | |
| 6,956,587 B1 | 10/2005 | Anson | |
| 7,218,780 B2 | 5/2007 | Nakayama | |
| 7,424,672 B2 | 9/2008 | Simske et al. | |
| 7,450,268 B2 * | 11/2008 | Martinez et al. | 358/1.9 |
| 7,599,101 B2 | 10/2009 | Ogiwara et al. | |
| 7,787,705 B2 * | 8/2010 | Sun et al. | 382/270 |
| 8,059,982 B2 | 11/2011 | Carlson et al. | |
| 8,213,687 B2 * | 7/2012 | Fan | 382/112 |
| 8,326,078 B2 | 12/2012 | Reddy | |
| 8,542,398 B2 | 9/2013 | Reddy | |
| 2001/0014183 A1 | 8/2001 | Sansom-Wai et al. | |
| 2002/0022954 A1 * | 2/2002 | Shimohata et al. | 704/3 |
| 2004/0148507 A1 * | 7/2004 | Iwamura et al. | 713/176 |
| 2005/0201619 A1 * | 9/2005 | Sun et al. | 382/176 |

(Continued)

FOREIGN PATENT DOCUMENTS

CA   2427468 A1   11/2004
JP   10134081 A   5/1998

OTHER PUBLICATIONS

Hewlett-Packard Company et al., "Page Content Detection For The Purposes of Achieving Accurate Cropping," Research Disclosure, published Nov. 2008.

(Continued)

*Primary Examiner* — Bhavesh Mehta
*Assistant Examiner* — Feng Niu

(57) ABSTRACT

Data representing an image of text is received, as is data representing the text in non-image form. A valid content boundary within the image of the text is determined. For each character within the text in the non-image form, a location of the character within the image of the text is determined. Where the location of the character within the image of the text falls outside the valid content boundary, the character is removed from the data representing the text in the non-image form.

22 Claims, 6 Drawing Sheets

(56) References Cited

U.S. PATENT DOCUMENTS

| | | | |
|---|---|---|---|
| 2005/0271285 A1* | 12/2005 | Kimura et al. | 382/233 |
| 2006/0098243 A1 | 5/2006 | Ahmed et al. | |
| 2006/0279783 A1 | 12/2006 | Kato | |
| 2007/0003157 A1 | 1/2007 | Eschbach et al. | |
| 2007/0253031 A1* | 11/2007 | Fan | 358/3.27 |
| 2007/0253620 A1 | 11/2007 | Nagarajan et al. | |
| 2008/0002893 A1* | 1/2008 | Vincent et al. | 382/229 |
| 2008/0002914 A1* | 1/2008 | Vincent et al. | 382/299 |
| 2008/0002916 A1* | 1/2008 | Vincent et al. | 382/305 |
| 2008/0018744 A1 | 1/2008 | Sasaki | |
| 2008/0018950 A1* | 1/2008 | Kobayashi | 358/450 |
| 2008/0107338 A1* | 5/2008 | Furmaniak et al. | 382/176 |
| 2008/0137958 A1 | 6/2008 | Wang et al. | |
| 2008/0232691 A1 | 9/2008 | Gkikas et al. | |
| 2009/0040569 A1 | 2/2009 | Hamzy | |
| 2009/0083028 A1* | 3/2009 | Davtchev et al. | 704/9 |
| 2009/0244648 A1 | 10/2009 | Chan et al. | |
| 2009/0252437 A1 | 10/2009 | Li et al. | |
| 2010/0189345 A1 | 7/2010 | Reddy et al. | |
| 2010/0220930 A1* | 9/2010 | Sun et al. | 382/190 |
| 2010/0225937 A1 | 9/2010 | Simske et al. | |
| 2010/0325535 A1 | 12/2010 | Reddy | |
| 2011/0110604 A1 | 5/2011 | Reddy et al. | |
| 2011/0320934 A1 | 12/2011 | Sayers et al. | |
| 2012/0154872 A1 | 6/2012 | Reddy | |
| 2013/0033521 A1* | 2/2013 | Karasin et al. | 345/619 |

OTHER PUBLICATIONS

Jian Fan, Xiaofan Lin, Steven Simske, "A Comprehensive Image Processing Suite for Book Re-Mastering," ICDAR05, p. 447-451. Aug. 2005.

SunTec, "Print on Demand (POD PDF)", http://www.suntecindia.com/date-entry-india/print-on-demand-pdf.htm, Dec. 20, 2010.

* cited by examiner

REMOVING CHARACTER FROM TEXT IN NON-IMAGE FORM WHERE LOCATION OF CHARACTER IN IMAGE OF TEXT FALLS OUTSIDE OF VALID CONTENT BOUNDARY

BACKGROUND

Text is frequently electronically received in a non-textually editable form. For instance, data representing an image of text may be received. The data may have been generated by scanning a hardcopy of the image using a scanning device. The text is not textually editable, because the data represents an image of the text as opposed to representing the text itself in a textually editable and non-image form, and thus cannot be edited using a word processing computer program, a text editing computer program, and so on. To convert the data to a textually editable and non-image form, optical character recognition (OCR) may be performed on the image, which generates data representing the text in a textually editable and non-image form, so that the data can be edited using a word processing computer program, a texting editing computer program, and so on.

DETAILED DESCRIPTION

As noted in the background section, data can represent an image of text, as opposed to representing the text itself in a textually editable and non-image form that can be edited using a word processing computer program, a text editing computer program, and so on. To convert the data to a textually editable and non-image form, optical character recognition (OCR) may be performed on the image. Performing OCR on the image generates data representing the text in a textually editable and non-image form, so that the data can be edited using a computer program like a word process computer program or a text editing computer program.

OCR can result in errors within the text in non-image form, due to stray marks on the image of the text being improperly considered when OCR is performed. As one example, the image of the text may be a scanned image of a page of a book. A person may have written notes in the margin of the page, and due to the age of the book, there may be dirt or other debris outside the text on the page. When OCR is performed, these stray marks are considered as part of the actual text of the page of the book, and the OCR attempts to convert the image of the stray marks into text in non-image form. OCR is typically unsuccessful when converting such stray marks, and even if the handwritten notes in particular are accurately converted into text in non-image form, they are typically not desired within the non-image form of the actual text of the page of the book.

Disclosed herein are techniques to remove characters that correspond to such handwritten notes and other stray marks within an image of text, from the data representing the text in non-image form. Data representing an image of text is received, as is data representing the text in non-image form, which may have been generated using OCR. A valid content boundary is determined within the image of the text. For each character within the text in the non-image form, the location of the character within the image of the text is determined. Where the location of the character within the image falls outside the valid content boundary, the character is removed from the data representing the text in the non-image form.

Figure 1:
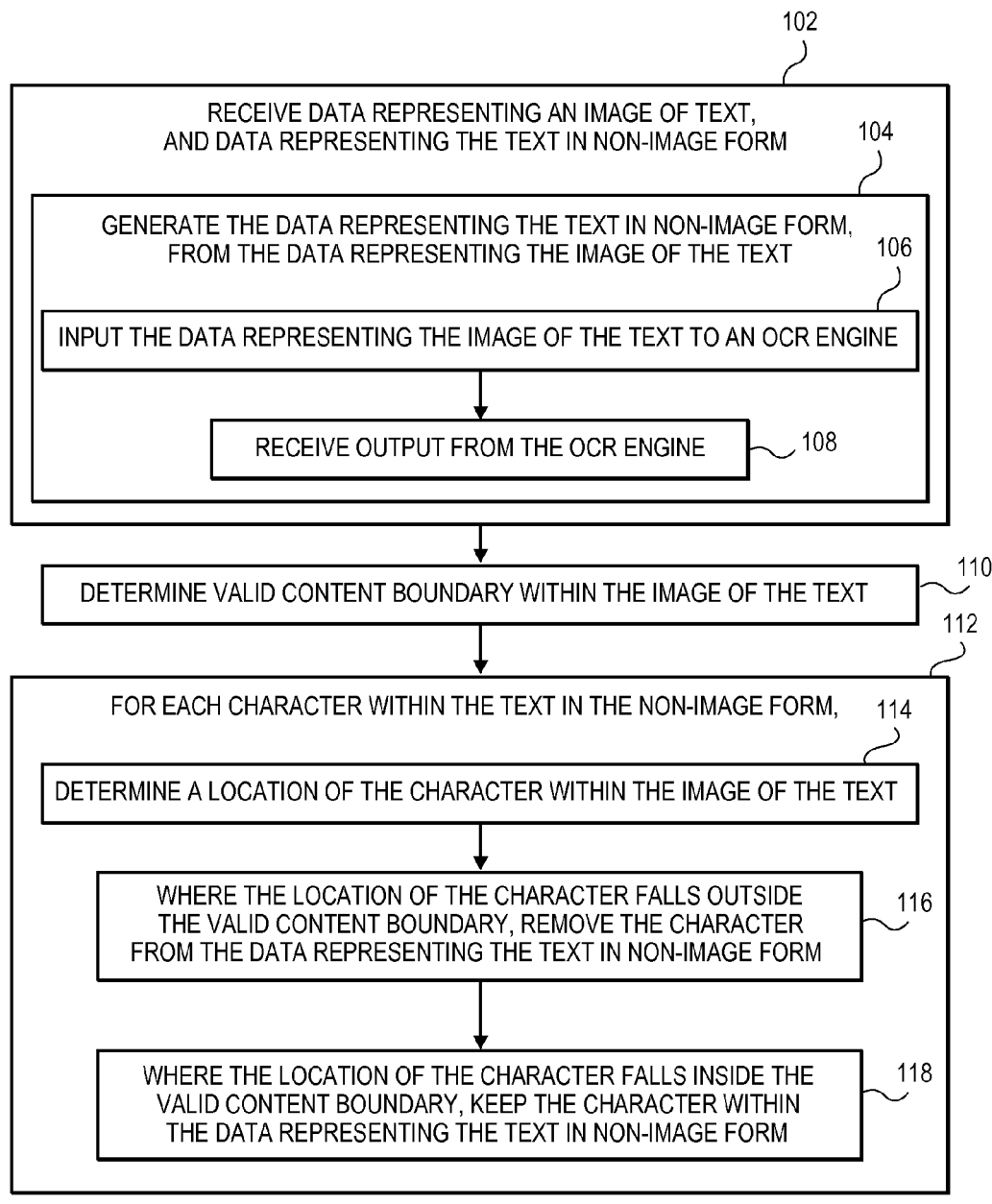
FIG. 1 is a flowchart of an example method for removing characters from data representing text in non-image form that correspond to stray marks within an image of the text, by determining a valid content boundary.

FIG. 1 shows a method 100, according to an example of the disclosure. The method 100 can be performed by a processor of a computing device, such as a desktop or a laptop computer. For example, a non-transitory computer-readable data storage medium may store a computer program, such that execution of the computer program by the processor results in the method 100 being performed. The method 100 can be performed without any user interaction.

Data representing an image of text, and data representing the text in non-image form, are received (102). The data representing the image of the text may be bitmap data in BMP, JPG, or TIF file format, among other image file formats. The data representing the image is not textually editable by computer programs like word processing and text editing computer programs. By comparison, the data representing the text in non-image form may be formatted in accordance with the ASCII or Unicode standard, for instance, and may be stored in a TXT, DOC, or RTF file format, among other text-oriented file formats. The data representing each character of the text can include a byte, or more than one byte, for each character of the text, in accordance with a standard like the ASCII or Unicode standard, among other standards to commonly represent such characters.

For example, consider a letter "q" in the text. A collection of pixels corresponds to the location of this letter within the image of the text. If the image is a black-and-white image, each pixel is on or off, such that the collection of on-and-off pixels forms an image of the letter "q." Note that this collection of pixels may differ depending on how the image was generated. For instance, one scanning device may scan a hardcopy of the text such that there are little or no artifacts (i.e., extraneous pixels) within the part of the image corresponding to the letter "q." By comparison, another scanning device may scan the hardcopy such that there are more artifacts within the part of the image corresponding to this letter.

From the perspective of a user, the user is able to easily distinguish the part of each image as corresponding to the letter "q." However, the portions of the images corresponding to the letter "q" are not identical to one another, and are not in correspondence with any standard. As such, without performing a process like OCR, a computing device is unable to discern that the portion of each image corresponds to the letter "q."

By comparison, consider the letter "q" within the text in a non-image form that may be textually editable. The letter is in accordance with a standard, like the ASCII or Unicode standard, by which different computing devices know that this letter is in fact the letter "q." From the perspective of a computing device, the computing device is able to discern that the portion of the data representing this letter within the text indeed represents the letter "q."

The data representing the text in non-image form may be generated from the image of the text (104). For example, the data representing the image of the text may be input to an OCR engine (106). The OCR engine is a computer program that performs OCR on the image of the text. In response, output is received from the OCR engine (108). This output is the data representing the text in non-image form.

A valid content boundary is determined within the image of the text (110). The valid content boundary is the boundary around a portion of the image of the text that corresponds to the actual desired text (i.e., the valid content) within the image. By comparison, other portions of the image, which are outside of the valid content boundary, do not correspond to the actual desired text. These other portions may include images of stray marks, such as images of dirt and debris, as well as images of handwritten notes.

Figure 2:
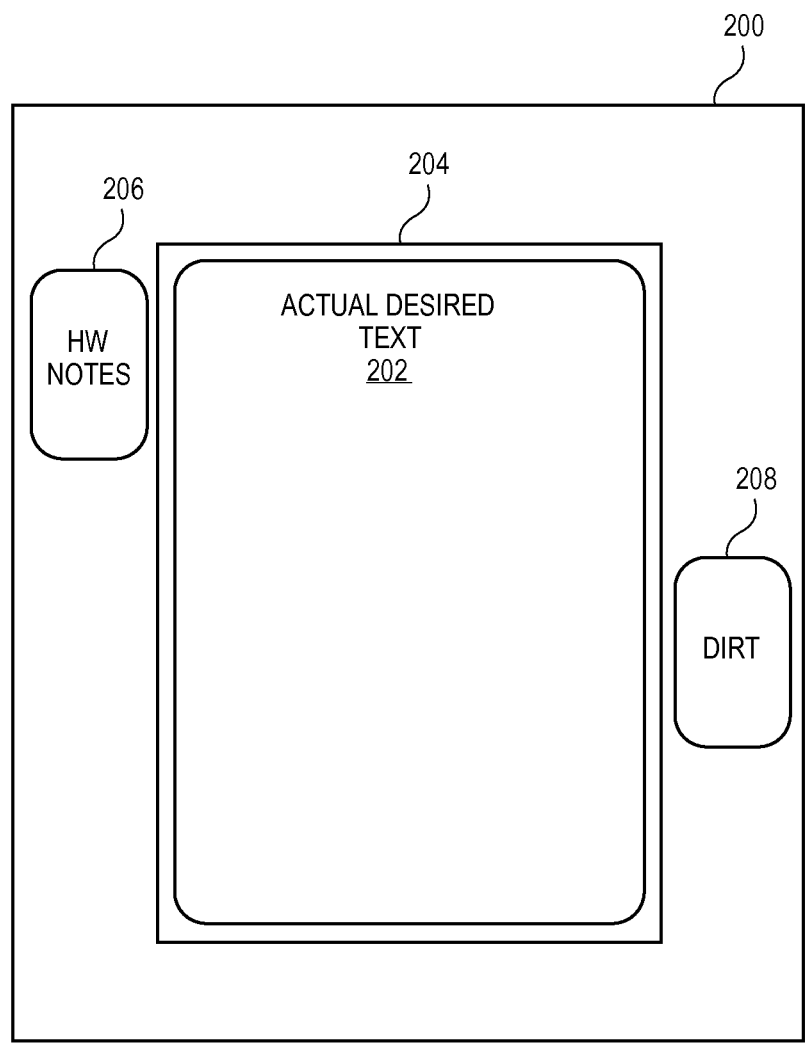
FIG. 2 is a diagram of an example image showing a valid content boundary in relation to actual desired text, handwritten notes, and dirt.

FIG. 2 shows an example image 200 of text. The image 200 may be an image of a page of a book, for instance. The image 200 includes an image 202 of the actual desired text, such as the actual text of the page of the book. The image 200 further includes an image 206 of notes handwritten in the left margin of this page, and an image 208 of dirt in the right margin of the page.

A valid content boundary 204 is determined within the image 200. The valid content boundary 204 surrounds the image 202 of the actual text of the page, such that the image 202 is located within the content boundary 204. By comparison, the valid content boundary 204 excludes the images 206 and 208, which are not images of the actual text of the page. That is, the images 206 and 208 are located outside the valid content boundary 204.

It is noted that the data representing the text in non-image form includes data representing text of the image 202, as well as data representing purported text of the images 206 and 208. For instance, OCR may have been performed on the entire image 200, including the images 206 and 208 as well as the image 202. As such, the data representing text in non-image form generated via this OCR includes data representing text of the images 206 and 208 as well as text of the image 202.

In general, the valid content boundary can be determined independently of the OCR engine that may have generated the data representing the text in non-image form from the data representing the image of the text. That is, how the text in non-image form is generated from the image of the text does not affect how the valid content boundary is determined. Furthermore, the valid content boundary can be determined after the text in non-image form has been generated from the image of the text.

Figure 3A:
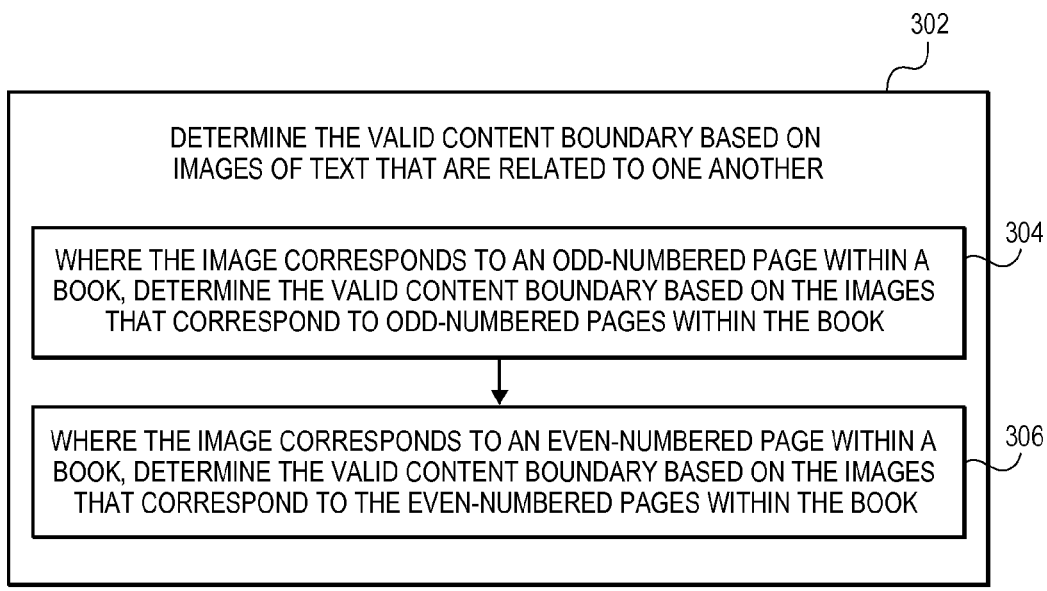
FIG. 3A is a flowchart of an example method for determining a valid content boundary in relation to an image of text.

In addition, FIG. 3A shows an example method 300 that can be used to determine the valid content boundary. In the method 300, the valid content boundary is determined based on images of text that are related to one another (302). For instance, the images of text may correspond to pages of a book, including odd-numbered pages and even-numbered pages.

If a given image corresponds to an odd-numbered page, then the valid content boundary for this given image is determined based on the images that correspond to odd-numbered pages (304). Likewise, if a given image corresponds to an even-numbered page, then the valid content boundary for this given image is determined based on the images that correspond to even-numbered pages (306). The distinction between odd-numbered and even-numbered pages is made because the left and right margins of odd-numbered pages typically are different from the left and right margins of even-numbered pages, due to the attachment of the pages to the spine of the book.

Figure 3B:
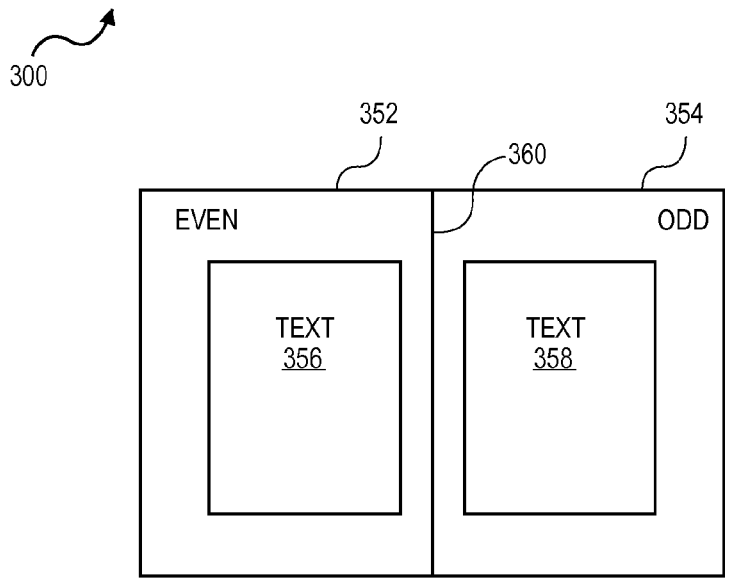
FIG. 3B is a diagram illustratively depicting representative performance of the example method of FIG. 3A.

For instance, FIG. 3B shows example images 352 and 354 of an even-numbered page and an odd-numbered page, respectively, of a representative book. The images 352 and 354 include text 356 and 358, respectively. Due to how the pages are attached to the spine of the book, the inner margins of the even-numbered page and the odd-numbered page are located closer to the spine than the outer margins are. However, the inner margin of the even-numbered page is this page's right margin, whereas the inner margin of the odd-numbered page is this page's left margin.

Therefore, determining the valid content boundary for the image 352 of the even-numbered page can be performed by locating the boundary of the text—including stray marks like handwritten notes and dirt—on each even-numbered page, and averaging the boundary across these pages. Even if some of the images 352 include stray marks, on average the proper valid content boundary will be located. The same process can be performed for the image 354 of the odd-numbered page, in relation to the other odd-numbered pages. The odd-numbered pages are processed separately from the even-numbered pages, though, because the inner margins of the former are different from the latter, as explained above.

Figure 4A:
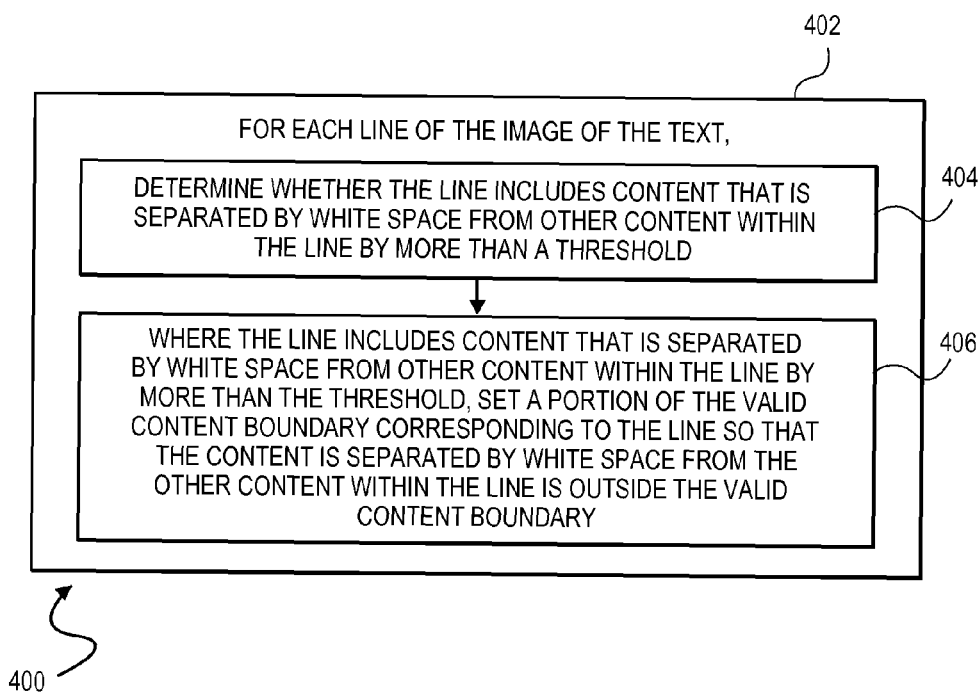
FIG. 4A is a flowchart of a second example method for determining a valid content boundary in relation to an image of text.

FIG. 4A shows another example method 400 that can be used to determine the valid content boundary. In the method 400, the valid content boundary is determined for each line of the image of the text (402). Specifically, for a given line, it is determined whether the line includes content that is separated by white space from other content within the line by more than a threshold (404). If the line includes such content that is separated by white space from other content by more than this threshold, then a portion of the valid content boundary corresponding to the line is set such that the former content is located outside the valid content boundary (406).

Figure 4B:
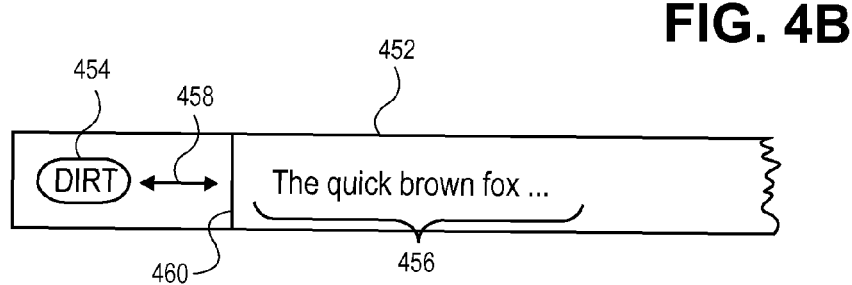
FIG. 4B is a diagram illustratively depicting representative performance of the example method of FIG. 4A.

For instance, FIG. 4B shows an example image 452 of a line of an image of text. The image 452 includes images 454 and 456 of content. The image 454 is specifically an image of dirt, or another type of stray mark, whereas the image 456 is an image of actual desired text. White space 458 separates the image 454 from the image 456. Assuming that the image 454 is separated from the image 456 by white space greater than a threshold, the valid content boundary 460 is set for the image 452 of the line in question so that the image 454 is located outside this boundary 460.

The threshold is generally set to be greater than the amount of white space that may separate content within the image 456 of actual desired text. For example, words of the actual text are separated by single spaces, and sentences may be separated by double spaces. Paragraphs may further begin with a tab's worth of white space. As such, the threshold of white space that separates undesired content from actual content is set so that it is greater than the largest amount of these types of white space.

Figure 5:
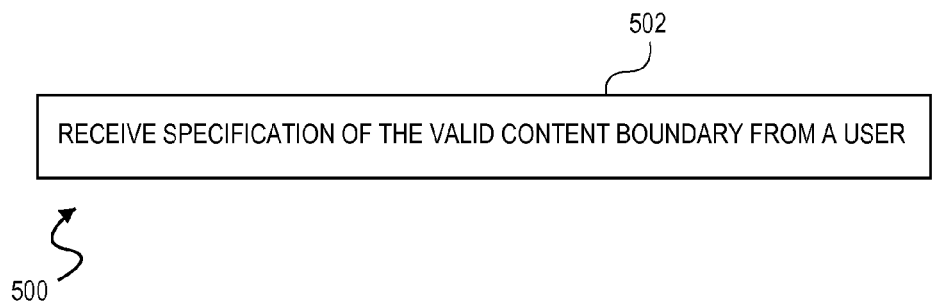
FIG. 5 is a flowchart of a third example method for determining a valid content boundary in relation to an image of text.

FIG. 5 shows a third example method 500 that can be used to determine the valid content boundary. Particularly, the processor performing the method 500 may receive a specification of the valid content boundary from a user (502). In this respect, the method 500 differs from the methods 300 and 400, which can be performed without user interaction. A user may be presented with an image of text, for instance, and asked to draw the valid content boundary using a pointer controlled by a pointer device like a mouse or a touchpad.

The methods 300, 400, and 500 that have been described can be utilized together or individually. As an example, the method 300 may be used to initially set the valid content boundary for an image of text corresponding to a page of a book. The method 400 may then be performed to fine-tune the valid content boundary set by the method 300. If there is too much extraneous content within the page, such as if the page has been extensively marked up with handwritten notes, then the user may be asked to specify the valid content boundary via the method 500. For instance, if the line-by-line determination of the valid content boundary results in the valid content boundary for more than a given number of lines deviating from the average valid content boundary for each line by more than a threshold, the user may be asked to specify the valid content boundary by the method 500.

Referring back to FIG. 1, once the valid content boundary has been determined within the image of the text, the following is performed for each character within the text in the non-image form (112). A corresponding location of the character within the image of the text is determined (114). For instance, this information may be provided by the OCR engine that generated the text in non-image form from the image of the text.

If the location of the character falls outside the valid content boundary within the image of the text, then this character is removed from the data representing the text in non-image form (116). By comparison, if the location of the character falls inside the valid content boundary within the image of the text, then this character is kept within the data representing the text in non-image form (118). In this way, portions of the text in non-image form that correspond portions of the image of the text that themselves correspond to stray marks and not to the actual desired text of the image are removed, on a character-by-character basis.

In some situations, however, even if the location of the character falls outside the valid content boundary within the image of the text, the character may be retained within the data representing the text in non-image form in part 116. This is because in some cases, characters outside the valid content boundary may nevertheless be valid. To check for this situation, for instance, in part 116 the font of the character outside the valid content boundary can be compared to one or more fonts of the characters located within the boundary. If the font size of the character outside the valid content boundary matches any of these fonts, and if the character is part of a word that is found in a dictionary, then the character is in part 116 retained within the data representing the text in non-image form.

Figure 6:
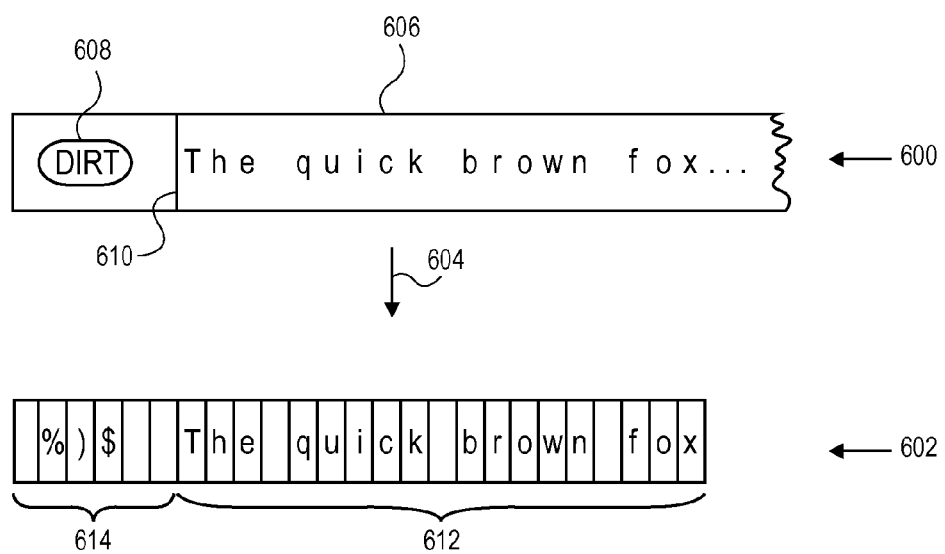
FIG. 6 is a diagram illustratively depicting representative performance of the example method of FIG. 1.

FIG. 6 illustratively depicts representative performance of part 112 of the method 100. Data 602 representing text in non-image form has been generated from data 600 representing an image of this text, as indicated by the arrow 604. The data 600 includes an image 606 of the actual text, as well as an image 608 of dirt or another type of stray mark. A valid content boundary 610 has been determined in relation to the data 600 of the image of the text. The data 602 representing the text in non-image form includes a number of characters 612 corresponding to the text of the image 606 and a number of characters 614 corresponding to the purported text of the image 608. The characters 614 are in actuality erroneous, since the image 608 is of dirt or another type of stray mark, and not of actual text.

Pursuant to part 112 of the method 100, the location of each character 614 and 612 within the images 608 and 606 represented by the data 600 is determined. Each character 614 is located outside the valid content boundary 610, and therefore pursuant to part 116 is removed from the data 602 representing the text in non-image form. By comparison, each character 612 is located inside the valid content boundary 610, and therefore pursuant to part 118 is kept within the data 602 representing the text in non-image form. After performance of part 112, then, the data 602 representing the text in non-image form includes just the characters 612, and not the characters 614, which have been removed.

Figure 7:
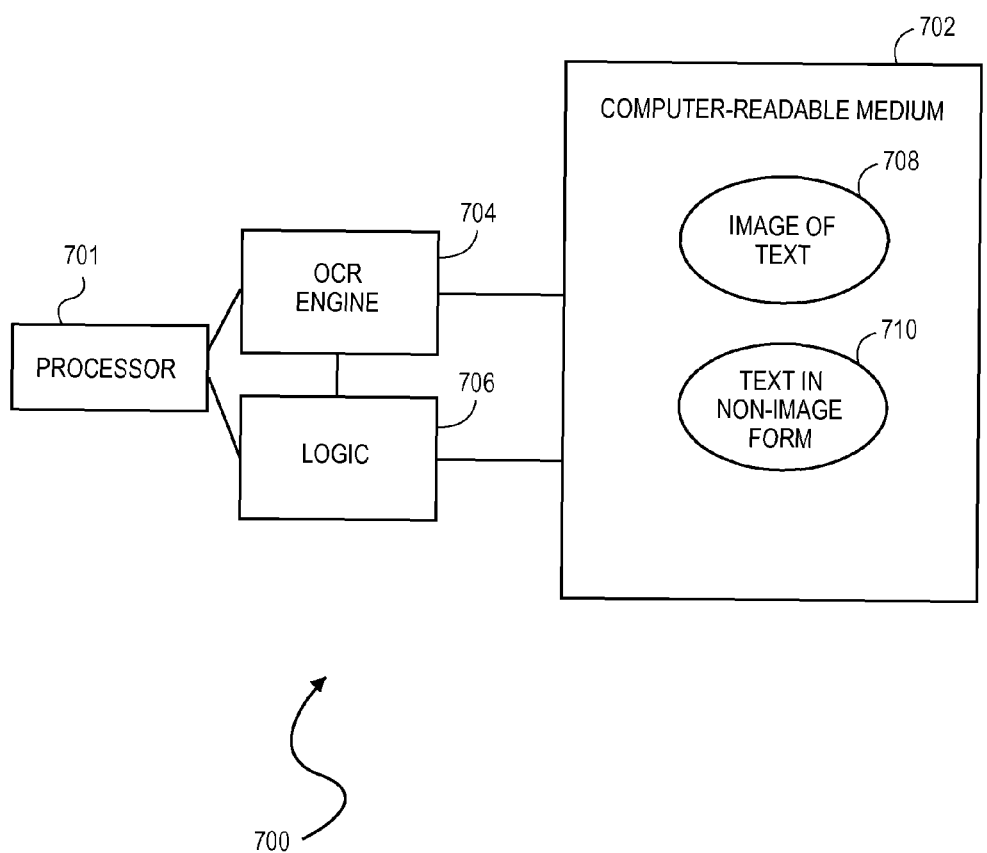
FIG. 7 is a diagram of an example rudimentary system.

In conclusion, FIG. 7 shows a rudimentary system 700, according to an embodiment of the invention. The system 700 may be implemented at one or more computing devices, such as desktop or laptop computers. The system 700 includes a processor 701, a non-transitory computer-readable data storage medium 702, at least one OCR engine 704, and logic 706. Examples of such computer-readable media include volatile and non-volatile semiconductor memory, magnetic media, and optical media, as well as other types of non-transitory computer-readable data storage media.

The computer-readable medium 702 stores data 708 representing an image of text, as well as data 710 representing this text in non-image form. The OCR engine 704 may be used to generate the data 710 from the data 708. The OCR engine 704 as such may be a computer program that is stored on the non-transitory computer-readable data storage medium 702, or another computer-readable medium, and executed by the processor 701.

The logic 706 is executed by the processor 701. As such, the logic 706 may be implemented as one or more computer programs stored on the computer-readable medium 702, or another computer-readable medium. The logic 706 performs the method 100, and may perform the methods 300, 400, and/or 500 as part of performing the method 100. As such, the logic 706 determines a valid content boundary within the image of the text represented by the data 708, and removes those characters from the text in non-image form represented by the data 710 that fall outside this boundary.

I claim:

1. A method comprising:
   receiving, by a processor, data representing an image of text, and data representing the text in non-image form;
   determining, by the processor, a valid content boundary within the image of the text, the valid content boundary dividing a portion of the image corresponding to valid text of the image from and excluding another portion of the image corresponding to one or more of stray marks, dirt, debris, and handwritten notes;
   for each character of a plurality of characters within the text in the non-image form,
      determining, by the processor, a location of the character within the image of the text; and
      where the location of the character within the image of the text falls outside the valid content boundary, removing the character from the data representing the text in the non-image form, by the processor.

2. The method of claim 1, further comprising, where the location of the character within the image of the text falls inside the valid content boundary, keeping the character within the data representing the text in the non-image form, by the processor.

3. The method of claim 1, further comprising generating the data representing the text in the non-image form by:
   inputting the data representing the image of the text to an optical character recognition (OCR) engine;
   receiving output from the OCR engine, the output being the data representing the text in the non-image form.

4. The method of claim 3, wherein determining the location of the character within the image of the text comprises receiving a specification of the location of the character within the image of the text from the OCR engine.

5. The method of claim 3, wherein the valid content boundary is determined independent of the OCR engine that generated the data representing the text in the non-image form.

6. The method of claim 1, wherein the image of the text is a given image of a plurality of images representing text and that are related to one another,
and wherein determining the valid content boundary within the image of the text comprises:
determining the valid content boundary based on one or more of the images that are related to one another.

7. The method of claim 6, wherein the images correspond to pages within a book.

8. The method of claim 6, wherein the image of the text corresponds to one of an odd-numbered page within the book and an even-numbered page within the book,
wherein where the image corresponds to an odd-numbered page within the book, determining the valid content boundary is based on the images that correspond to odd-numbered pages within the book,
and wherein where the image corresponds to an even-numbered page within the book, determining the valid content boundary is based on the images that correspond to even-numbered pages within the book.

9. The method of claim 1, wherein determining the valid content boundary within the image of the text comprises:
for each line of a plurality of lines of the image of the text,
determining whether the line includes content that is separated by white space from other content within the line by more than a threshold;
where the line includes content that is separated by white space from other content within the line by more than the threshold, setting a portion of the valid content boundary corresponding to the line so that the content that is separated by white space from the other content within the line is outside the valid content boundary.

10. The method of claim 1, wherein determining the valid content boundary within the image of the text comprises:
receiving a specification of the valid content boundary from a user.

11. The method of claim 1, wherein the character is not removed from the data representing the text in the non-image form where the location of the character within the image of the text falls outside the valid content boundary, the character has a font matching a font of a second character within the text that falls inside the valid content boundary, and the character is part of a word that is found within a dictionary.

12. A non-transitory computer-readable data storage medium storing a computer program executable by a processor, execution of the computer program by the processor causing a method to be performed, the method comprising:
receiving first data representing an image of text and a marking other than the text, and second data representing the text and the marking in non-image form, the marking represented within the second data as if the marking were part of the text;
determining a valid content boundary within the image, the valid content boundary dividing a portion of the image corresponding to the text from and excluding another portion of the image corresponding to the marking;
for each character of a plurality of characters within the second data,
determining a location of the character within the first data; and
where the location of an image portion within the first data corresponding to the character falls outside the valid content boundary, removing the character from the second data.

13. The non-transitory computer-readable data storage medium of claim 12, wherein the method further comprises generating the second data by:
inputting the first data to an optical character recognition (OCR) engine;
receiving output from the OCR engine, the output being the second data,
wherein the valid content boundary is determined independent of the OCR engine that generated the second data.

14. The non-transitory computer-readable data storage medium of claim 12, wherein the image is a given image of a plurality of images that are related to one another,
and wherein determining the valid content boundary within the image comprises:
determining the valid content boundary based on one or more of the images that are related to one another.

15. The non-transitory computer-readable data storage medium of claim 12, wherein determining the valid content boundary within the image of the text comprises:
for each line of a plurality of lines of the image of the text,
determining whether the line includes content that is separated by white space from other content within the line by more than a threshold;
where the line includes content that is separated by white space from other content within the line by more than the threshold, setting a portion of the valid content boundary corresponding to the line so that the content that is separated by white space from the other content within the line is outside the valid content boundary.

16. The non-transitory computer-readable data storage medium of claim 12, wherein the marking comprises one or more of stray marks, dirt, debris, and handwritten notes.

17. A computing system comprising:
a processor;
a computer-readable data storage medium to store first data representing an image of text and a marking other than the text, and second data representing the text and the marking in non-image form, the marking represented within the second data as if the marking were part of the text; and
logic executable by the processor to determine a valid content boundary within the image, the valid content boundary dividing a portion of the image corresponding to the text from and excluding another portion of the image corresponding to the marking, and for each character of a plurality of characters within the second data, to remove the character from the second data where the logic has determined that a location of an image portion within the first data corresponding to the character falls outside the valid content boundary.

18. The computing system of claim 17, further comprising an optical character recognition (OCR) engine to generate the second data,
wherein the logic is to determine the valid content boundary independent of the OCR engine generating the second data.

19. The computing system of claim 17, wherein the image is a given image of a plurality of images that are related to one another,
and wherein the logic is to determine the valid content boundary within the image based on one or more of the images that are related to one another.

20. The computing system of claim 17, wherein the images correspond to pages within a book, and the image of the text corresponds to one of an odd-numbered page within the book and an even-numbered page within the book, wherein where the image corresponds to an odd-numbered page within the book, the logic is to determine the valid content boundary based on the images that correspond to odd-numbered pages within the book, and wherein where the image corresponds to an even-numbered page within the book, the logic is to determine the valid content boundary based on the images that correspond to even-numbered pages within the book.

21. The computing system of claim 17, wherein the logic is to determine the valid content boundary within the image by:

for each line of a plurality of lines of the image of the text,
        determining whether the line includes content that is separated by white space from other content within the line by more than a threshold;

where the line includes content that is separated by white space from other content within the line by more than the threshold, setting a portion of the valid content boundary corresponding to the line so that the content that is separated by white space from the other content within the line is outside the valid content boundary.

22. The computing system of claim 17, wherein the marking comprises one or more of stray marks, dirt, debris, and handwritten notes.

* * * * *

UNITED STATES PATENT AND TRADEMARK OFFICE
CERTIFICATE OF CORRECTION

| | | |
|---|---|---|
| PATENT NO. | : 8,682,075 B2 | Page 1 of 1 |
| APPLICATION NO. | : 12/980036 | |
| DATED | : March 25, 2014 | |
| INVENTOR(S) | : Prakash Reddy | |

It is certified that error appears in the above-identified patent and that said Letters Patent is hereby corrected as shown below:

In the claims

In column 9, line 1, in Claim 20, delete "claim 17," and insert -- claim 19, --, therefor.

Signed and Sealed this
Sixth Day of October, 2015

Michelle K. Lee
*Director of the United States Patent and Trademark Office*